(12) United States Patent
Nottingham et al.

(10) Patent No.: US 6,557,059 B1
(45) Date of Patent: Apr. 29, 2003

(54) PARALLEL PERIPHERAL INTERFACE

(75) Inventors: James R. Nottingham, Boise, ID (US);
Calvin K. McDonald, Boise, ID (US);
James G. Eldredge, Meridian, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/416,599

(22) Filed: Oct. 12, 1999

(51) Int. Cl.$^7$ .............................................. G06F 13/00
(52) U.S. Cl. ................................ 710/62; 710/4; 710/5; 710/7; 710/8; 710/20; 710/31; 710/107; 710/110; 710/268
(58) Field of Search ............................... 710/4, 7, 8, 5, 710/20, 31, 107, 110, 268

(56) References Cited

U.S. PATENT DOCUMENTS

| | | | | |
|---|---|---|---|---|
| 5,590,369 A | * | 12/1996 | Burgess et al. | 710/110 |
| 5,606,707 A | * | 2/1997 | Tomassi et al. | 345/418 |
| 5,961,629 A | * | 10/1999 | Nguyen et al. | 712/23 |
| 6,092,138 A | * | 7/2000 | Schutte | 710/113 |
| 6,125,421 A | * | 9/2000 | Roy | 711/5 |
| 6,247,088 B1 | * | 6/2001 | Seo et al. | 710/129 |

\* cited by examiner

*Primary Examiner*—Jeffrey Gaffin
*Assistant Examiner*—Mohammad O. Farooq
(74) *Attorney, Agent, or Firm*—Marger Johnson & McCollom, P.C.

(57) ABSTRACT

The invention provides apparatus for the transfer of data/command between a master controller and one or more client controllers. The apparatus in accordance with the invention includes a bi-directional data bus for conveying plural bits of data or command between a master controller and one or more client controllers; direction signal controlling the direction in which data or command bits are conveyed on the data bus as between the master controller and a connected one of the one or more client controllers; a pair of ready signals including a transmit ready signal asserted by a source of data or command bits placed on the data bus and including a receive ready signal asserted by a destination for the data or command bits placed on the data bus; and a clock signal for indicating the presence of valid data or command bits on the data bus on a leading or trailing edge thereof. Preferably, a command/data signal is also provided to indicate the type of information placed on the data bus by the source.

In accordance with one aspect of the invention, the pair of ready signals includes a bi-directional transmit ready signal and a bi-directional receive ready signal corresponding to each one of the one or more client controllers, and wherein the functions of the transmit ready signals and the receive ready signals within the interface are modified by the state of the direction signal, whereby under a first state of the direction signal a transmit ready signal is asserted by the master controller to select one of the one or more client controllers as a destination for the data or command bits placed on the data bus and a corresponding receive ready signal is asserted by the one client controller to indicate that the one client controller is ready to receive the data or command bits placed on the data bus and whereby under a second state of the direction signal a transmit ready signal is asserted by the one or more client controllers to indicate the one or more client controllers is ready to transmit data or command bits placed on the data bus and a corresponding receive ready signal is asserted by the master controller to acknowledge receipt of data or command bits placed on the data bus by the one client controller.

22 Claims, 5 Drawing Sheets

PARALLEL PERIPHERAL INTERFACE

BACKGROUND OF THE INVENTION

This invention relates to parallel peripheral interfaces associated with digital computers. More particularly, the invention concerns a compact high-speed bi-directional hardware interface between a master controller, e.g. a computer, and one or more client controllers, e.g. peripherals.

SUMMARY OF THE INVENTION

The invention provides apparatus for the transfer of data/command between a master controller and one or more client controllers. The apparatus in accordance with the invention includes a bi-directional data bus for conveying plural bits of data or command between a master controller and one or more client controllers; direction signal controlling the direction in which data or command bits are conveyed on the data bus as between the master controller and a connected one of the one or more client controllers; a pair of ready signals including a transmit ready signal asserted by a source of data or command bits placed on the data bus and including a receive ready signal asserted by a destination for the data or command bits placed on the data bus; and a clock signal for indicating the presence of valid data or command bits on the data bus on a leading or trailing edge thereof. Preferably, a command/data signal is also provided to indicate the type of information placed on the data bus by the source.

In accordance with one aspect of the invention, the pair of ready signals includes a bidirectional transmit ready signal and a bi-directional receive ready signal corresponding to each one of the one or more client controllers, and wherein the functions of the transmit ready signals and the receive ready signals within the interface are modified by the state of the direction signal, whereby under a first state of the direction signal a transmit ready signal is asserted by the master controller to select one of the one or more client controllers as a destination for the data or command bits placed on the data bus and a corresponding receive ready signal is asserted by the one client controller to indicate that the one client controller is ready to receive the data or command bits placed on the data bus and whereby under a second state of the direction signal a transmit ready signal is asserted by the one or more client controllers to indicate the one or more client controllers is ready to transmit data or command bits placed on the data bus and a corresponding receive ready signal is asserted by the master controller to acknowledge receipt of data or command bits placed on the data bus by the one client controller.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1:
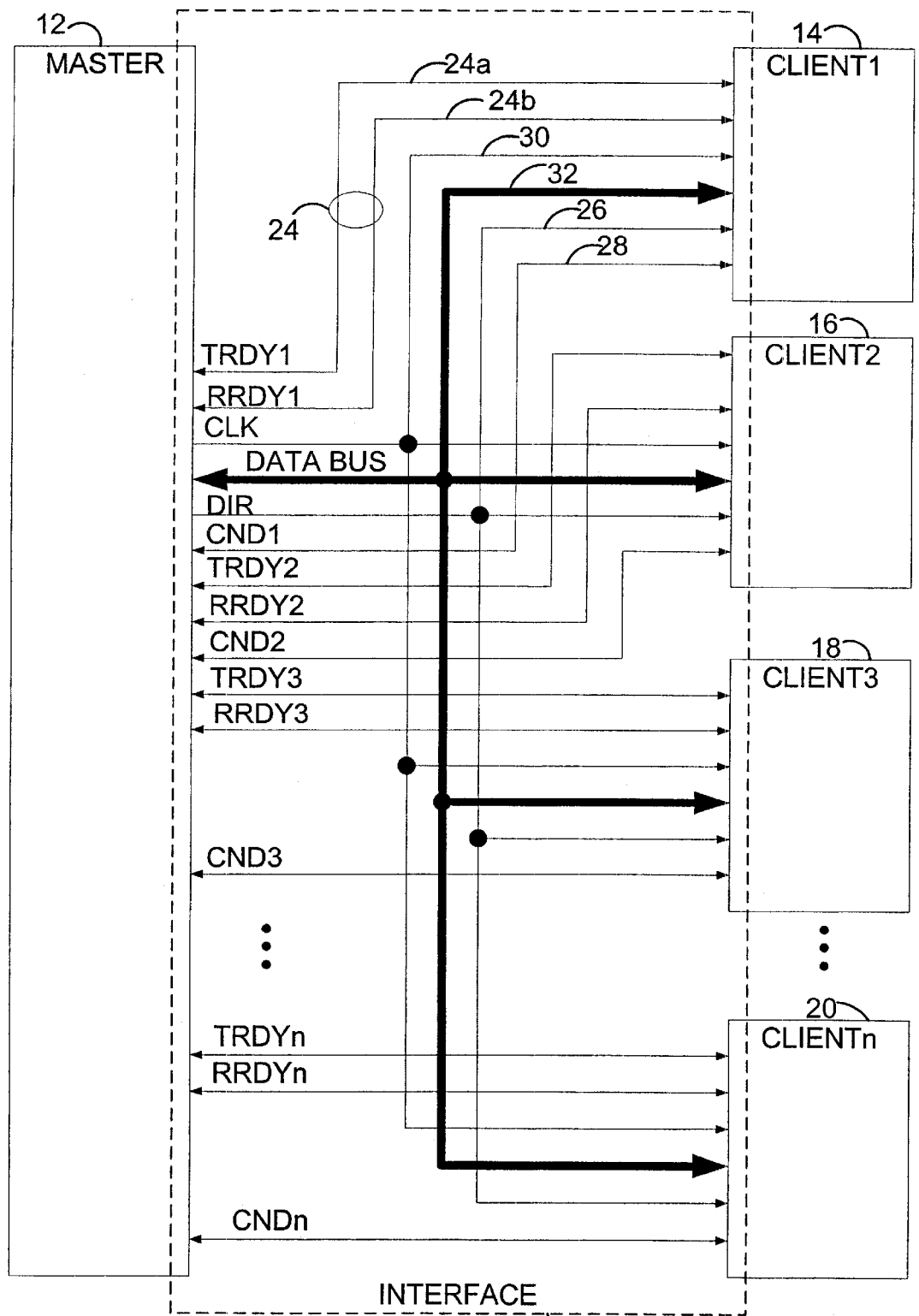
FIG. 1 is a system block diagram of a system including the interface configured in accordance with the invention.

FIG. 1 schematically illustrates a system 10 including an interface configured in accordance with the invention. System 10 includes a MASTER controller 12 and any one or more of n client controllers such as client controllers CLIENT1, CLIENT2, CLIENT3 and CLIENTn labeled 14, 16, 18 and 20, respectively. Any one client controller may be referred to herein as CLIENTx (not shown). Those of skill in the art will appreciate that n represents the number of client controllers interfaced to master controller 12. In accordance with the invention, n is application-specific and determines the number of client-specific control signals that master controller 12 supports. Those of skill in the art also will appreciate that the number n affects throughput to each client controller, because of the shared-bus architecture of the interface illustrated in FIG. 1, but that the total throughput of the interface is substantially unaffected by n.

A compact number of signals define the interface 22 in accordance with the invention. Interface 22 includes a defined set of interface signals and associated driver/receiver and protocol enforcement hardware or firmware that facilitate high-speed, bi-directional data/command transfers between master controller 12 and the client controllers. For the sake of simplicity, these interface signals and associated hardware or firmware are shown only for CLIENT1 and CLIENTn. Those of skill in the art will appreciate that the same set of signals is defined between master controller 12 and each client controller connected therewith, where x designates the connected client controller.

The signals within interface 22 are defined below by reference to Table I. Each table entry includes the signal's name, polarity (↑ for leading edge; H for high; L for low), input/output (I/O) designation relative to the master controller and functional description. It will be understood that discussions herein regarding CLIENTx apply generally to any client controller served by invented interface 22.

TABLE I

| | | | |
|---|---|---|---|
| Interface Signal Definitions | | | |
| Name | Polarity | I/O | Description |
| CLK | ↑H | Out | Interface Clock relative to which all data/command bus transfers occur. The interface in accordance with one embodiment of the invention will support four speeds for this clock: Fs/2, Fs/4, Fs/8, and Fs/16, where Fs is the operating frequency of the master clock of system 10. |

TABLE I-continued

Interface Signal Definitions

| Name | Polarity | I/O | Description |
| --- | --- | --- | --- |
| DIR | H | Out | Transfer Direction for data/command words on the bus.<br>Master Mode: DIR = '1' Indicates the master-to-client controller transfer direction.<br>Client Mode: DIR = '0' Indicates the client-to-master controller transfer direction. |
| DATA(w:0) | H/L | In/Out | Data/command bus (w bits). |
| TRDYx* | H | In/Out | Transmit Ready for Client 'x' used to initiate command and data transfers.<br>In Client Mode (DIR = '0'), TRDYx is an input to the master that is used for bus arbitration. This signal indicates that client 'x' is ready to transmit valid data.<br>In Master Mode (DIR = '1'), TRDYx is an output from the master that is used to select the destination client for a transfer. In this mode, TRDYx indicates that the host is ready to transmit valid data to client 'x'.<br>TRDYx should remain active as long as valid data is ready to transmit. |
| RRDYx* | H | In/Out | Receive Ready for CLIENTx used to acknowledge command and data transfers.<br>In Client Mode (DIR = '0'), RRDYx is an output from the master that is used to acknowledge a transfer from CLIENTx.<br>In Master Mode (DIR = '1'), RRDYx is an input to the master that indicates CLIENTx is ready to receive valid data.<br>RRDYx should remain active as long as data can be received and while TRDYx is active. When TRDYx deasserts, RRDYx should deassert and re-arbitrate the bus. |
| CNDx* | H/L | In/Out | Command/Not Data for CLIENTx used to indicate the type of data/command transfer. In Client Mode, CNDx is driven by the client. In Master Mode, CNDx is driven by the master.<br>Data Transfer: CNDx = '0' indicates that the current transfer is data.<br>CMD Transfer: CNDx = '1' indicates that the current transfer is a command. |

Total Interface Signal Count: 3n (TRDYx, RRDYx, CNDx) + w Data + 1 DIR + 1 CLK = 3n + w + 2 signals

*The interface supports up to n clients (x = 1, 2, 3, 4 . . . n).

The interface protocol in accordance with the invention may be described as follows, with reference to Table I and FIG. 1. The protocol is based upon a pair of signals used to transfer commands and/or data back and forth between master controller 12 and any client controller CLIENTx. (It will be understood x is used herein to designate anyone of a plurality of clients, i.e., x=1, 2, 3 . . . .n.) The paired ready signals, indicated at 24 in FIG. 1, include two ready signals, TXRDYx and RXRDYx, as indicated at 24a and 24b. Paired ready signals 24a and 24b indicate when data can be transmitted or received. Importantly, paired signals 24a, 24b within ready signal pair 24 are bidirectional signals that may be driven by either the master controller or the client controller, depending upon the state of DIR.

A DIR signal 26 is provided that serves an important dual purpose: It indicates the direction of the data bus as well as establishing the Master/Client Mode of interface 22. In Client Mode (DIR='0') TRDYx is an input to the master controller driven by CLIENTx to indicate to the master controller that it is ready to transmit data or commands over the data bus. In Master Mode (DIR '1') TRDYx is an output to CLIENTx driven by the master controller to select which one of the one or more client controllers the master controller is ready to transmit data or commands over the data bus. In Client Mode (DIR '0') RRDYx is an output to CLIENTx driven by the master controller to acknowledge receipt of data or commands over the data bus. In Master Mode (DIR='1') RRDYx is an input to the master controller driven by CLIENTx to indicate to the master controller that CLIENTx is ready to receive data or commands over the data bus. Assigning the DIR signal this dual purpose by establishing its gating and timing requirements as a part of the protocol of interface 22 serves to decrease the number of signals required by interface 22.

It may be understood that ready signal pair 24 performs a variety of functions within the compact set of signals provided by interface 22. Because the function of these two ready signals is dependent upon the state of the interface's Master/Client Mode condition (which in turn is determined by the state of the data bus direction signal (DIR)), functionality of TRDY1 signal 24a and RRDY1 signal 24b within ready signal pair 24 effectively is doubled. Because data bus direction signal 26 (DIR) also serves to establish the Master/Client Mode condition, the functionality of the DIR signal also effectively is doubled.

The beneficial result of such multiplied signal functionality is that the invented interface has increased versatility without a corresponding increase in signal count or complexity.

In addition to the ready signals, a direction signal 26 (DIR) is used to determine the direction of the transfer and a data/command signal 28 (CND1) may be used to indicate the type of transfer (command or data). Valid data/command transfers occur on any rising edge of a clock signal 30 (CLK) in which both TRDYx and RRDYx are asserted. Such data/command transfers occur via the source of data or command placing data or command bits on a parallel data bus 32 of any desired width w, e.g. 16 bits, for receipt thereof by the destination. It will be understood that MASTER controller 12 may be source of such data or command, with any of client controllers 14, 16, 18, 20 being the destination or that any of client controllers 14, 16, 18, 20 may be a source of such data or command, with MASTER controller 12 being the destination.

In this manner, data/command control words can be transferred in a selected direction between the master and one of n client controllers on every rising or falling clock edge. This provides a minimum of bus-turnaround latency or delay, so long as both ready control signals are asserted. Accordingly, the need for a request/acknowledgement handshake protocol (such as the well-established request-to-send (RTS)/clear-to-send (CTS) handshake) for each word transferred is eliminated by the burst-transfer mode of operation of the interface.

Those of skill in the art will appreciate that the data/command bus is general purpose and may be used to convey either data or command words between MASTER controller 12 and any client controller such as CLIENTx. Whether the w bit-wide data field is treated by the destination of the data/command as data or command is application-specific. Such may be indicated, in accordance with a preferred embodiment of the invention, by the source of the data/command for the purpose of identifying to the destination of the data/command how to act on the data/command upon receipt. In this embodiment, only twenty-one signals (including CNDx signal 28) are required to support a single client controller.

In an alternative embodiment within the spirit and scope of the invention, CNDx signal 28 might not be used and only twenty signals would be required in the interface to support one client controller, with each additional client controller requiring only two additional signals. In this alternative embodiment, those of skill in the art will appreciate that the contents of the data/command field would be coded by the source and decoded by the destination to indicate whether the remaining contents of the field are to be treated as data or command. Such coding of data or command may be done in accordance with any suitable protocol, e.g. the well-known printer command language (PCL).

Such generality renders interface 22 very useful in a variety of high-speed bi-directional applications in which a variety of client controllers may be connected with interface 22 common to all of them. Such client controllers within peripheral products may provide a wide range of functionality ranging, for example, from printing, facsimile, copying and optical character recognition to external disc drives, slave computers or external storage modules, e.g. disk drives or other memory devices.

Figure 2:
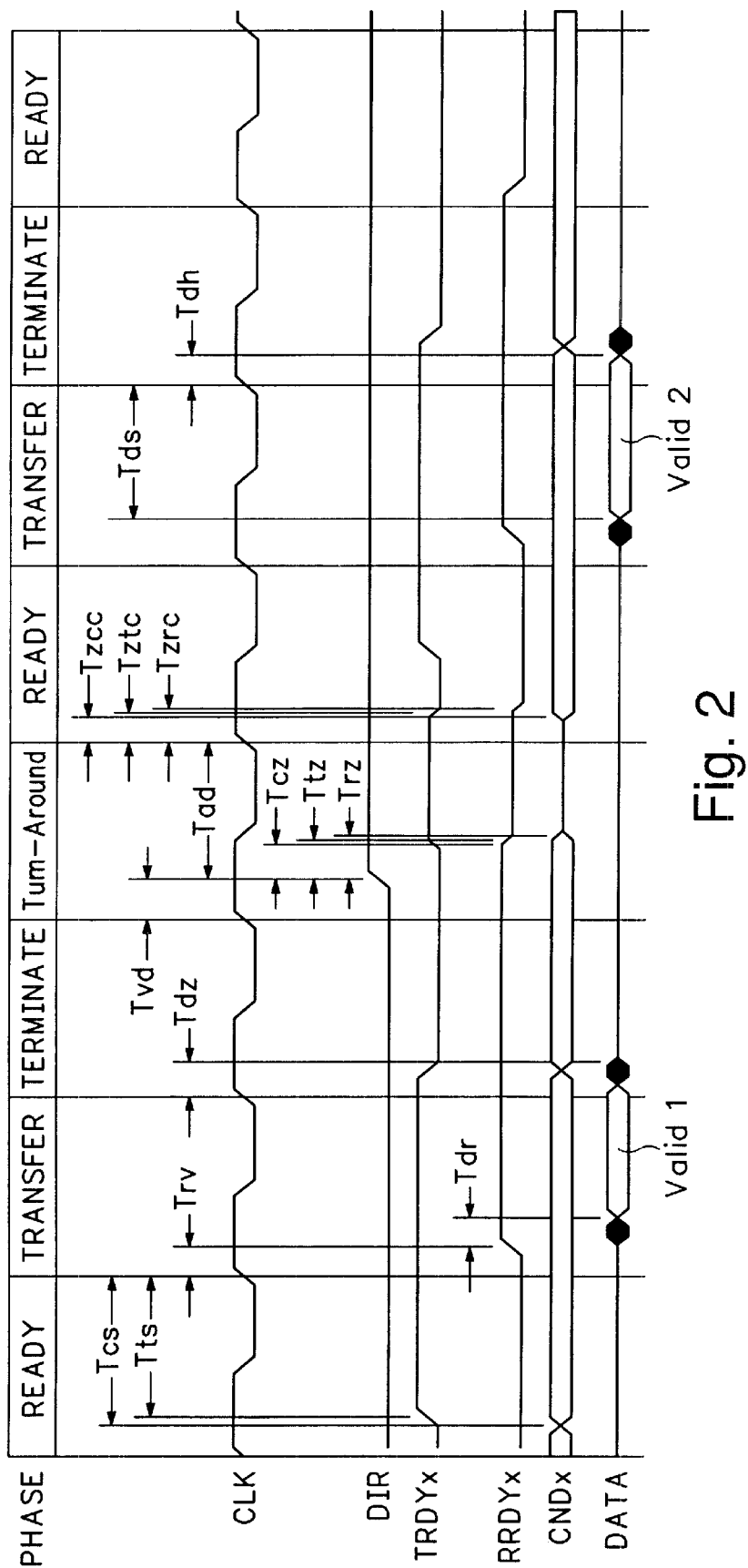
FIG. 2 is a timing diagram illustrating a single-transfer of data/command across the interface.
Figure 3:
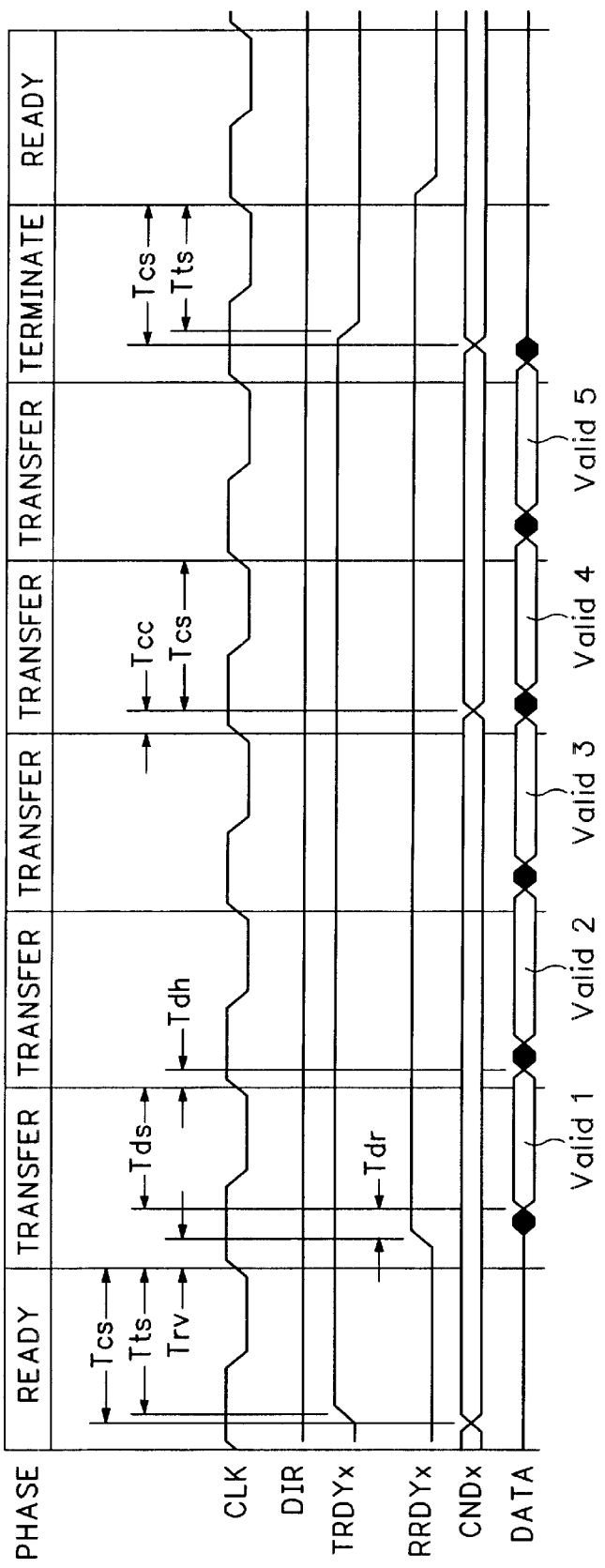
FIG. 3 is a timing diagram illustrating a burst-transfer of data/command across the interface.

Timing waveforms for single and burst accesses on interface 22 are shown in FIGS. 2 and 3. In FIGS. 2 and 3 the "phase" designator is used to show the different cycles associated with various interface transfers. Each of these "phases" and the corresponding state of interface 22 are described below.

It is important to note that the interface protocol is identical for both transfer directions of interface 22. In other words, accesses from MASTER controller 12 to any client controller CLIENTx have the same protocol as accesses from any client controller CLIENTx to MASTER controller 12. A mechanism for switching the direction of the data/command bus is provided, and there is a protocol for what will be referred to herein as a "turn-around" phase that occurs when the direction of the bus is changed by changing the state of direction signal 26 (DIR). Those of skill in the art will appreciate that the direction-switching mechanism is implemented in accordance with the invention within MASTER controller 12 as part of what will be described as gating/timing logic that may take the form of a gate array, ASIC, discrete circuitry, etc.

The interface clock signal is generated at the master-side of the interface. The frequency of the interface clock should be a programmable derivative of the system frequency. More particularly, the interface clock frequency or rate is selectable among SCLK/2, SCLK/4, SCLK/8, and SCLK/16, where SCLK is the clock rate or operating frequency of system 10 shown in FIG. 1. As an example, if the system operating frequency is 64MHz, then the interface clock frequency is selectable from among 32MHz, 16MHz, 8MHz, and 4MHz. This allows ample flexibility when the interface is incorporated in different systems or needs to meet different computer or peripheral speeds. Of course, those of skill in the art will appreciate that, within the spirit and scope of the invention, any clock of any frequency may be used, whether dependent upon the system clock CLK or independent thereof.

The discussion immediately below makes reference to portions of FIGS. 2 and 3, which are interface phase/timing diagrams.

READY Cycle: All command and data transfers begin with a READY cycle. During this phase, the transmitting device asserts TRDYx signal 24a and CNDx signal 28. On the first rising edge of CLK signal 30 in which TRDYx is asserted, RRDYx signal 24b is asserted if the receiving device (master or client) can receive a word. To allow maximum decode time, the receiving device should also sample CNDx during this cycle to determine if the transfer is command or data. The receiving device should latch the value of CNDx on every clock edge that TRDYx is asserted. This allows for a full cycle of command/decode time in the receiving device prior to the arrival of data. Upon assertion of the RRDYx signal by the receiving device, the transmitting device should drive data on the bus. The transmitting device must place the data bus in a tri-state condition whenever the TRDYx and RRDYx signals are not asserted.

TRANSFER Cycle(s): TRANSFER cycles occur immediately following the READY phase. A TRANSFER cycle occurs during any cycle in which TRDYX signal 24a and RRDYx signal 24b are both asserted on a rising edge of CLK signal 30. One word of data of any desired width w is transferred on any clock edge that occurs concurrent with assertion of the RRDYx and TRDYx signals. For single-access transfers, the TRANSFER cycle is one cycle long. For burst-access transfers, TRANSFER cycles occur until either the TRDYx or RRDYx signal is deasserted. If the RRDYx signal deasserts and the TRDYx signal remains asserted, then as soon as the receive buffer can accept another word, a new transfer can start with another READY cycle. If TRDYx is deasserted prior to RRDYx, then a TERMINATE cycle is initiated. Another TRANSFER (and corresponding READY) cycle cannot begin until the TERMINATE cycle is complete. In either case, the data/command bus should be placed in a tri-state condition when either of the ready signals is deasserted.

Note that CNDx signal 28 can change state during any transfer cycle to indicate a different transfer type (command or data). This is possible because CNDx is latched, in accordance with the invention, by the master controller and by each client controller on any edge of CLK signal 30 that TRDYx signal 24a is asserted. This provides the would-be destination, or receiving, device with an entire CLK cycle to decode CNDx prior to the next clock edge. Since TRDYx and CNDx are asserted during the READY phase, the destination device will always have one cycle to decode changes to this signal before latching the data that corresponds with the CNDx and TRDYx signals.

TERMINATE Cycle: A TERMINATE cycle occurs whenever TRDYx signal 24a is deasserted during a transfer. On the first edge of CLK signal 30 following the deassertion of TRDYx, the destination device should deassert RRDYx signal 24b. This allows for re-arbitration of the interface during a subsequent READY cycle. Note that the would-be source, or transmitting, device is required to deassert the CNDx signal concurrent with the deassertion of TRDYx. In addition, the data bus should be placed in a tri-state condition by the source device during this cycle.

Turn-Around Cycle: Turn-Around cycles are initiated by a change in state of DIR signal 26. Whenever the DIR signal changes state (H→L or L→H), both sides of the interface— e.g. MASTER controller 12 as well as each CLIENT controllers 14, 16, 18, 20—are allowed the duration of the Turn-Around cycle to assert and deassert tri-state enablement signals. This places the bus in its quiescent, tri-state, condition. It also allows for transfers in the opposite direction. It is important to note that this is the only cycle during which MASTER controller 12 can change the DIR signal, in accordance with the invention.

Those of skill in the arts will appreciate that, in accordance with the invention, the default mode of operation of the interface is client-to-master controller transfers. Direction changes within the spirit and scope of the invention may be accomplished by software or firmware on the master controller side of the interface. For example, a preferably hardware register within MASTER controller 12 may contain a status bit that controls the DIR signal within the interface, which register may be written by CLIENTx with the cooperation of the master controller. A client controller such as CLIENT controller 14, 16, 18 or 20 may request direction changes using special purpose commands on the interface contained within the data/command field, in accordance with an essentially private protocol defined between the master controller and one or more of the connected client controllers. Direction changes can also be initiated automatically by firmware transfers of CMD/Data information (i.e. whenever firmware sends command or data information to a client, the hardware can auto-switch the DIR signal).

Timing parameters from the waveforms shown in FIGS. 2 and 3 are given in Table II below.

TABLE II

Interface Timing Parameters

| Parameter | Symbol | Min. | Typ. | Max. |
|---|---|---|---|---|
| TRDYx to CLK Setup | Tts | 16ns | — | — |
| CNDx to CLK Setup | Tcs | 16ns | — | — |
| RRDYx Valid from CLK | Trv | — | — | 8ns |
| Data Setup | Tds | 16ns | — | — |
| Data Hold | Tdh | 1ns | — | — |

TABLE II-continued

Interface Timing Parameters

| Parameter | Symbol | Min. | Typ. | Max. |
|---|---|---|---|---|
| Data Valid from RRDYx | Tdr | — | — | 8ns |
| Data to Z (tri-state) from CLK | Tdz | — | — | 8ns |
| DIR Valid from CLK | Tvd | — | — | 8ns |
| DIR Setup | Tsd | 16ns | — | — |
| CNDx to Z | Tcz | — | — | 8ns |
| TRDYx to Z | Ttz | — | — | 8ns |
| RRDYx to Z | Trz | — | — | 8ns |
| Z to CNDx from CLK | Tzcc | — | — | 8ns |
| Z to TRDYx from CLK | Tztc | — | — | 8ns |
| Z to RRDYx from CLK | Tzrc | — | — | 8ns |

Those skilled in the art will appreciate that the timing parameters shown in Table II are exemplary only of a particular embodiment of the invention and are not intended to limit the scope of the invention. Because the interface in accordance with the invention can operate at four different operating frequencies, there are several different bandwidth scenarios to consider. Table IV provides a reference for various interface bandwidth scenarios. Burst transfers ("Xfers") occur at the so-called 'peak' rate of the interface, while single transfers have a lower maximum bandwidth. From the protocol description above, it can be seen that the peak transfer rate for the interface is two bytes (one word) per CLK cycle.

Those of skill in the art will appreciate that data bus 32 of interface 22 may be narrower than 16 bits wide, e.g. 8 bits (byte), or wider than 16 bits, e.g. 32 (double word), within the spirit and scope of the invention. All suitable widths for data bus 32 are contemplated, with a corresponding decrease or increase in bandwidth and signal count, respectively. Likewise, those of skill in the art will appreciate that clock speeds may be higher than those illustrated above in Table I and immediately below in Table III, thereby further increasing the bandwidth, within the spirit and scope of the invention.

Table III provides maximum bandwidth numbers for various operating scenarios, all of which assume that w=16, i.e. that the data bus is 16-bits wide (2-bytes wide). It will be appreciated that the bandwidth numbers are illustrative only of a specific embodiment of the invention, and that they are not intended to limit the scope of the invention in any way.

TABLE III

Maximum Interface Bandwidth Capabilities

Generic Bandwidth Calculus (MB/s)

| CLK = SCLK/2 | | CLK = SCLK/4 | | CLK = SCLK/8 | | CLK = SCLK/16 | |
|---|---|---|---|---|---|---|---|
| Single Xfers | Burst Xfers | Single Xfers | Burst Xfers | Single Xfers | Burst Xfers | Single Xfers | Burst Xfers |
| SCLK/3 | SCLK | SCLK/6 | SCLK/2 | SCLK/12 | SCLK/4 | SCLK/24 | SCLK/8 |

Bandwidth Calculations for 64 MHz System Clock (MB/s)

| CLK = 32 MHz | | CLK = 16 MHz | | CLK = 8 MHz | | CLK = 4 MHz | |
|---|---|---|---|---|---|---|---|
| Single Xfers | Burst Xfers | Single Xfers | Burst Xfers | Single Xfers | Burst Xfers | Single Xfers | Burst Xfers |
| 21.33 | 64 | 10.67 | 32 | 5.33 | 16 | 2.67 | 8 |

Electrical specifications for the interface in accordance with the invention are provided in Table IV below. Those of skill in the art will appreciate that the electrical specifications of a particular implementation may be different from those listed below, depending upon gate and circuit types or application-specific integrated circuit- (ASIC-) or other chip-specific details of the interface. An interface in accordance with the invention having alternative electrical characteristics from those listed below, thus, is within the spirit and scope of the invention.

TABLE IV

Interface Electrical Specifications

| Parameter | Symbol | Min. | Typ. | Max. |
|---|---|---|---|---|
| High-Level Input Voltage | VIH | 2.0V | — | — |
| Low-Level Input Voltage | VIL | — | — | 0.8V |
| High-Level Output Voltage | VOH | 2.4V | — | — |
| Low-Level Output Voltage | VOL | — | — | 0.5V |
| Current Source | IOH | 6mA | — | — |
| Current Sink | IOL | −6mA | — | — |

Again, those of skill in the art will appreciate that the above electrical specifications are illustrative of a specific embodiment of the invention and are not to be construed as limiting in any way the scope of the invention.

Figure 4:
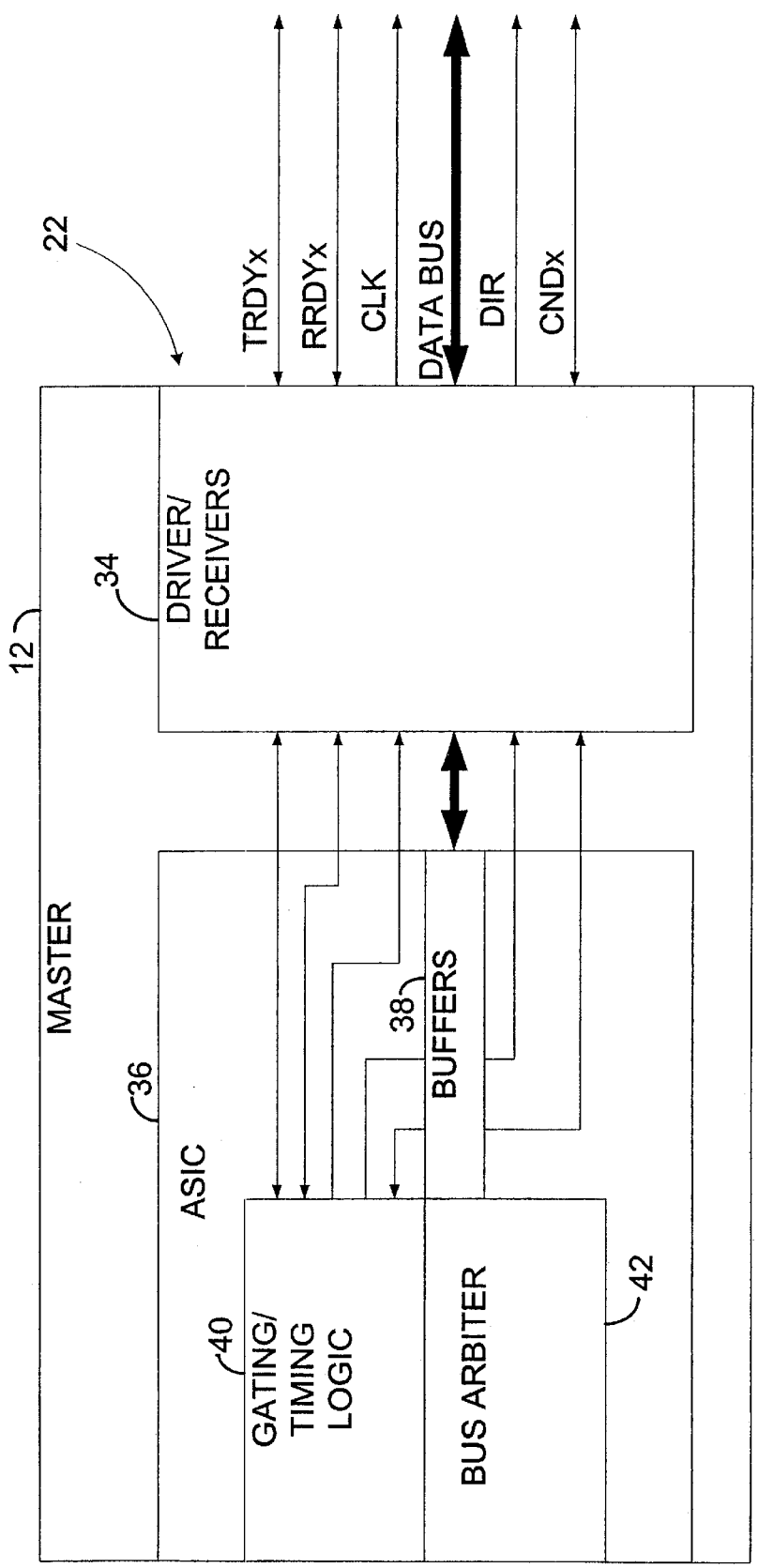
FIG. 4 is a block diagram of a master controller in accordance with the invention.
Figure 5:
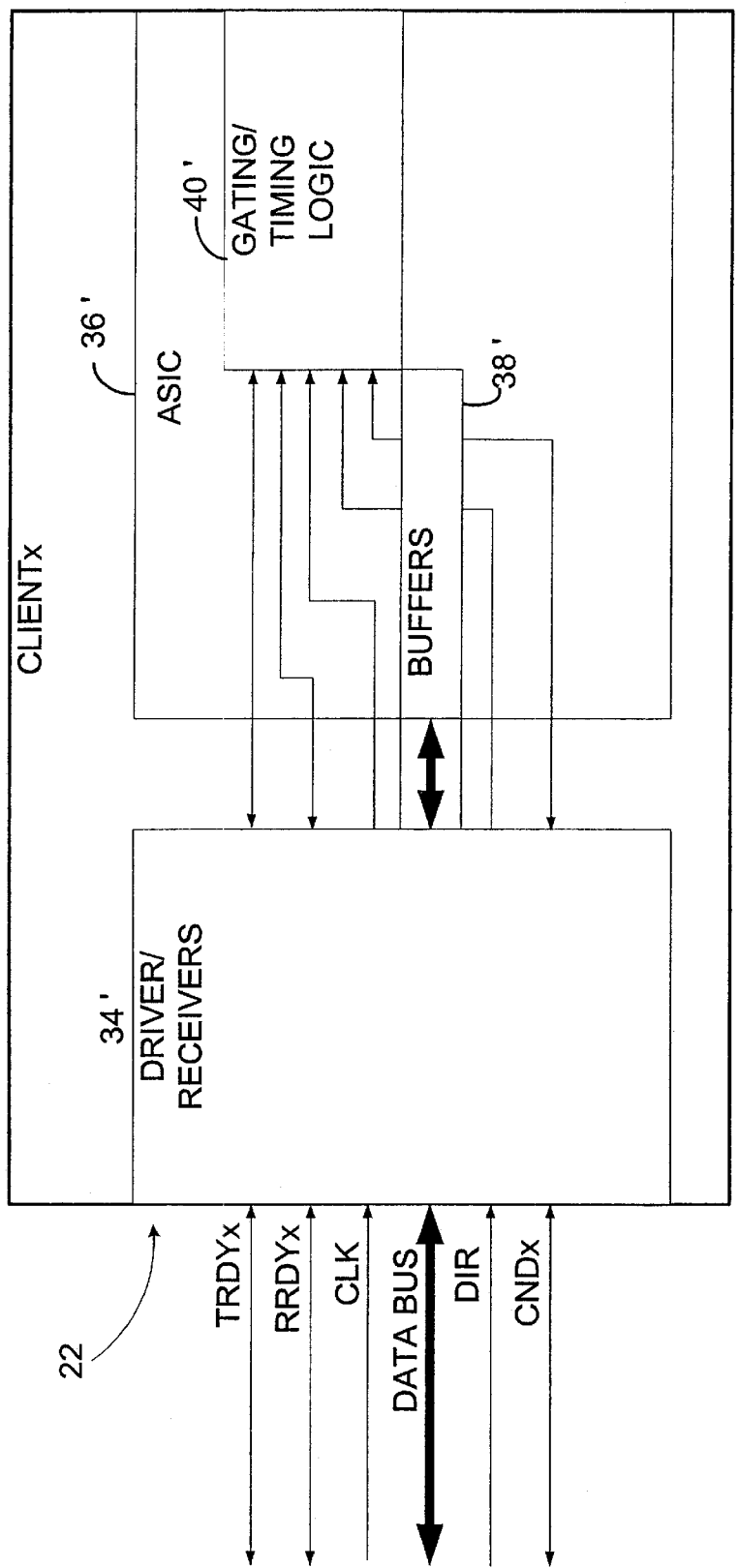
FIG. 5 is a block diagram of a client controller in accordance with the invention.

Referring now to FIGS. 4 and 5, the organization of a typical MASTER controller and a typical CLIENTx controller will be described in some detail. In accordance with the invention, interface 22 may be implemented in the form of one or more gate or logic arrays, which may be field or factory programmed to perform the required gating and timing functions described in detail above. Alternatively, the interface may be implemented in the form of one or more ASICs masked to perform the required gating and timing functions. Preferably, a single ASIC implements the hardware interface protocol for a master controller and a different single ASIC implements the hardware interface protocol for each of the one or more client controllers. Other suitable organizations and implementations are contemplated, within the spirit and scope of the invention.

FIG. 4 shows the MASTER controller 12 part of interface 22, MASTER controller 12 including driver/receiver circuitry 34 coupling the DATA BUS and other interface signals TRDYx, RRDYx, CLK, DIR and CNDx with an ASIC 36. ASIC 36 includes data buffers 38, gating/timing logic 40 and bus arbitration logic, or bus arbiter, 42. Gating/timing logic 40 may include one or more writable hardware registers that enable MASTER controller 12 to treat one or more connected CLIENT controllers like CLIENTx in a manner that is application specific. For example, one or more CLIENT controllers within interface 22 may be characterized as being uni-directional or as including embedded data and commands within the data/command bit field or as being of different bit field widths. Such a hardware register may be programmed to contain flags and status bits that enable MASTER controller 12 to have greater versatility and to provide for data/command conveyances to and/or from one or more CLIENT controllers having a wide range of speed and functionality.

Those of skill in the art will appreciate that ASIC 36 is masked in accordance with the invention to implement the MASTER side of the hardware protocol that is described in detail above, including the buffering, bus arbitration and gating and timing functions described in connection with Tables I, II and IV. Those of skill in the art will appreciate that driver/receiver circuitry 34 may be implemented, within the spirit and scope of the invention, within ASIC 36 to provide a single-IC solution implementing the MASTER portion of interface 22.

FIG. 5 is very similar to FIG. 4 and uses primed reference designators for corresponding elements of FIG. 4 in order to highlight these similarities.

FIG. 5 shows a CLIENT controller CLIENTx part of interface 22. CLIENT controller CLIENTx includes driver/receiver circuitry 34' coupling the DATA BUS and other interface signals TRDYx, RRDYx, CLK, DIR and CNDx with an ASIC 36'. Like ASIC 36 within MASTER controller 12, ASIC 36' includes data buffers 38' and gating/timing logic 40', but those of skill in the art will appreciate that the bus arbitration function is controlled by MASTER controller 12 which supplies the CLK and DIR signals throughout interface 22 and which determines which of the one or more CLIENT controllers within interface 22 may access the DATA BUS. Those of skill in the art will appreciate that ASIC 36' similarly is masked in accordance with the invention to implement the CLIENT side of the hardware protocol that is described in detail above, including the buffering, gating and timing functions described in connection with Tables I, II and IV. Those of skill in the art will appreciate that driver/receiver circuitry 34' may be implemented, within the spirit and scope of the invention, within ASIC 36' to provide a single-IC solution implementing the complimentary CLIENT portion of interface 22.

Within the spirit and scope of the invention, various design details may be included or not within interface 22. For example, data buffering may be provided in any suitable form within MASTER controller 12, as by the use of plural FIFO's dedicated to one or more connected CLIENT controllers. Data buffering may or may not be provided in CLIENTx, and may be provided in any suitable form that may provide less extensive buffering because of the singular data channel requirements of a typical CLIENT controller. Also, it will be appreciated by those skilled in the art that bus arbiter 42 may be embedded within gating/timing logic in MASTER controller 12, depending upon the particular ASIC implementation of interface 22.

It will be appreciated that FIGS. 4 and 5 do not show other functional aspects of a typical MASTER controller and a CLIENT controller, which typically are part of a larger computer or peripheral system and form no part of the present invention. For example, MASTER controller 12 may be a part of a more complex controller, computer or network of computers and may support many peripherals and interfaces thereto other than interface 22 in accordance with the invention. Similarly, CLIENT controller CLIENTx may be a part of a more complex computer subsystem or may be an interface to another computer or network that itself supports many peripherals and interfaces other than interface 22. Thus, it will be understood that FIGS. 4 and 5 are intended not to limit the overall functionality of MASTER controller 12 or CLIENT controller CLIENTx, but instead simply to illustrate the broad utility of interface 22 therein.

Those of skill in the art will appreciate that many of the interface functions are identical or similar between the master controller and a client controller. Accordingly, it is contemplated by the invention and within the spirit and scope thereof to realize the invention in the form of a single ASIC that is configurable at a late step in the manufacturing process to perform the functions of either a master controller or a client controller. It is also contemplated as being within the spirit and scope of the invention to implement the hardware interface protocol within a generic interface IC that is configurable to act as either a master controller or a client controller. The generic interface IC may be so configured under program control by system driver software or it may auto-configure by the application of external bias logic, e.g. a jumper or switch, located in the PCB circuitry of which it is a part.

Chip architectures and gate-level designs implementing the interface in a straight forward manner may be realized by the use of a hardware description language (HDL) and other readily available computer-aided design (CAD) tools, as will be understood by those of skill in the art.

Within the spirit and scope of the invention, the chip architecture implementing the interface may contain further functionality. Data buffering is one example, discussed briefly above. Data buffering may provide one or more data/command buffers in the form, for example, of a first-in, first-out (FIFO) for streamlining data/command flow between the master controller and a client controller and for ensuring data/command readiness within the interface's timing constraints. Other data/command buffering techniques may be used, of course, within the spirit and scope of the invention.

The chip may also include driver/receiver, termination and other required signal conditioning hardware, as it does in accordance with a preferred embodiment of the invention, enabling direct connections between a master controller and physically more closely coupled client controllers. Alternatively, driver/receiver hardware may be included in the interface—external to the chip that enforces the hardware protocol—thereby to reduce capacitive loading on the chip and to increase a) the number n of client controllers that may be accommodated and/or b) their electrical distance from the master controller.

Those of skill in the art will appreciate that loading and other signal conditioning constraints may be placed on an interface made in accordance with the invention, i.e. one that implements a single-chip solution. This will depend, as is known to those of skill in the art, upon particular chip, board and cable manufacturing technologies and processes including gate architectures, cell types and I/O or bonding pad and conductor routing dimensions, etc.

Such a solution as is described and illustrated herein will be seen to be extremely cost effective. This is because computer or master controller manufacturers or peripheral and client controller manufacturers may simply design into their products the chip in accordance with the protocol, timing, gating and chip pin-out requirements in accordance with the specifications described herein. In this way, product or system providers, as well as original equipment manufacturers (OEMs) and other third-party providers, can utilize the invented interface by marketing a master controller, one or more client controllers, or systems including both a master controller and one or more client controllers.

The physical embodiment of the interface may take a variety of forms. Thus, it will be understood that the single-IC implementation is only one of a variety of means by which the protocol, timing and gating functions may be achieved. Alternative hardware, firmware and software implementations are within the spirit and scope of the invention. For example, the interface including the driver/receiver or other signal conditioning hardware may be incorporated in a flex circuit, printed circuit board, motherboard, ribbon cable, discrete-wire cable or wiring harness, by the use of one or more ICs integrated within a substrate or surface mounted thereon between layers of a laminated interconnect lattice. Any suitable form for routing needed interface signals between a master controller and one or more client controllers is contemplated and is within the spirit and scope of the invention.

The functions of the interface may be distributed between the master controller and one or more client controllers in any suitable way, e.g. the master controller may be relatively 'smart' and a given one or more client controllers relatively 'dumb.' This, regardless of whether the functions are implemented physically within the master controller, one or more client controllers, or somewhere therebetween (as in an interconnecting motherboard, so-called "interface" board, printed circuit board, flex circuit, cable or wiring harness).

The data bus, direction signal, ready signal pair, clock signal and data/command signal may be routed between the master controller and one or more client controllers in any suitable manner. The signals of the invented interface may take the form of conductive signal wires within a cable or wiring harness, or may be routed as conductive circuit paths or traces on or within a printed or wired circuit board. Any and all suitable means of conveying signals between the master controller and one or more client controllers are within the spirit and scope of the invention.

Having illustrated and described the principles of this invention in a preferred embodiment thereof, it should be readily apparent to those skilled in the art that the invention can be modified in arrangement and detail without departing from such principles. We claim all modifications coming within the spirit and scope of the accompanying claims:

What is claimed is:

1. Apparatus for the transfer of data/command between a master controller and one or more client controllers, the apparatus comprising:
    a bi-directional data bus for conveying plural bits of data or command between a master controller and one or more client controllers;
    a direction signal controlling the direction in which data or command bits are conveyed on the data bus as between the master controller and one of the one or more client controllers;
    a pair of bi-directional ready signals including a bidirectional transmit ready signal asserted by a source of data or command bits placed on the data bus and including a bi-directional receive ready signal asserted by a destination for the data or command bits placed on the data bus; and
    a clock signal for indicating the presence of valid data or command bits on the data bus on a leading or trailing edge thereof.

2. The apparatus of claim 1 which further comprises a data/command signal asserted by a source of data or commands placed on the data bus, the data/command signal indicating to the destination for the data or command bits placed on the data bus whether the bits are data or command.

3. Apparatus for the transfer of data/command between a master controller and one or more client controllers, the apparatus comprising:
    a bi-directional data bus for conveying plural bits of data or command between a master controller and one or more client controllers;
    a direction signal controlling the direction in which data or command bits are conveyed on the data bus as between the master controller and one of the one or more client controllers;
    a pair of ready signals including a transmit ready signal asserted by a source of data or command bits placed on the data bus and including a receive ready signal asserted by a destination for the data or command bits placed on the data bus;

a clock signal for indicating the presence of valid data or command bits on the data bus on a leading or trailing edge thereof; and a data/command signal asserted by a source of data or commands placed on the data bus, the data/command signal indicating to the destination for the data or command bits placed on the data bus whether the bits are data or command, wherein the apparatus is characterized by plural signals numbering only 3n+w+2 wherein w is the width of the data bus and wherein n is the number of client controllers.

4. The apparatus of claim 3 wherein w is the width of the data bus and wherein n is the number of client controllers and wherein w=16 and wherein the data bus, the direction signal, the pair of ready signals, the clock signal and the data/command signal number twenty-one or fewer.

5. The apparatus of claim 3 for use with two client controllers wherein w=16 and wherein the data bus, the pair of ready signals, the clock signal and the data/command signal number twenty-four or fewer.

6. The apparatus of claim 3 for use with three client controllers wherein w=16 and wherein the data bus, the pair of ready signals, the clock signal and the data/command signal number twenty-seven or fewer.

7. The apparatus of claim 2 which comprises a pair of bi-directional ready signals and a data/command signal for each of the one or more client controllers.

8. The apparatus of claim 2 wherein timing constraints among said bus and said ready, data/command, direction and clock signals are prescribed for the master controller and the one or more client controllers, and wherein said timing constraints are enforced by one or more integrated circuits.

9. The apparatus of claim 7 wherein said one more integrated circuits take the form of programmable logic arrays.

10. The apparatus of claim 7 wherein said integrated circuit takes the form of one or more application-specific integrated circuits (ASICS).

11. The apparatus of claim 9 wherein at least one of said one or more ASICs is mounted in the master controller and at least another of said one or more ASICs is mounted in the one or more client controllers.

12. The apparatus of claim 1 wherein plural bits of data/command are conveyed from source to destination across the interface only when both of the pair of bi-directional ready signals are asserted.

13. Apparatus for the transfer of data/command between a master controller and one or more client controllers, the apparatus comprising:

a bi-directional data bus for conveying plural bits of data or command between a master controller and one or more client controllers;

a direction signal controlling the direction in which data or command bits are conveyed on the data bus as between the master controller and one of the one or more client controllers;

a pair of ready signals including a transmit ready signal asserted by a source of data or command bits placed on the data bus and including a receive ready signal asserted by a destination for the data or command bits placed on the data bus; and a clock signal for indicating the presence of valid data or command bits on the data bus on a leading or trailing edge thereof, wherein the pair of ready signals includes a bi-directional transmit ready signal and a bi-directional receive ready signal corresponding to each one of the one or more client controllers, and wherein the functions of the transmit ready signals and the receive ready signals within the interface are modified by the state of the direction signal, whereby under a first state of the direction signal a transmit ready signal is asserted by the master controller to select one of the one or more client controllers as a destination for the data or command bits placed on the data bus and a corresponding receive ready signal is asserted by the one client controller to indicate that the one client controller is ready to receive the data or command bits placed on the data bus and whereby under a second state of the direction signal a transmit ready signal is asserted by the one or more client controllers to indicate the one or more client controllers is ready to transmit data or command bits placed on the data bus and a corresponding receive ready signal is asserted by the master controller to acknowledge receipt of data or command bits placed on the data bus by the one client controller.

14. The apparatus of claim 1 wherein the direction and clock signals are controlled by the master controller.

15. The apparatus of claim 1 wherein said data bus is placed in a tri-state condition when not in use by the source of data or commands.

16. The apparatus of claim 1 wherein said data bus, said clock signal and said direction signal are shared by the one or more client controllers and the master controller.

17. The apparatus of claim 16 wherein said clock signal and said direction signal are controlled by the master controller.

18. The apparatus of claim 1 wherein said clock signal and said direction signal are controlled by the master controller.

19. Apparatus for the transfer of data/command between a master controller and one or more client controllers, the apparatus comprising:

a bi-directional data bus for conveying plural bits of data or command between a master controller and one or more client controllers;

a direction signal controlling the direction in which data or command bits are conveyed on the data bus as between the master controller and one of the one or more client controllers;

a pair of ready signals including a transmit ready signal asserted by a source of data or command bits placed on the data bus and including a receive ready signal asserted by a destination for the data or command bits placed on the data bus; and a clock signal for indicating the presence of valid data or command bits on the data bus on a leading or trailing edge thereof, wherein said clock signal and said direction signal are controlled by the master controller and wherein in a first mode of operation a single instance of data or command is conveyed over the data bus by the source of data or commands and wherein in a second mode of operation plural instances of data or command are conveyed over the data bus by the source of data or commands, whereby in said second mode of operation said pair of ready signals is asserted throughout said plural-instance data or command conveyance and whereby successive plural instances of data or command are conveyed from source to destination across the interface at the frequency of the clock signal.

20. The apparatus of claim 1 which further comprises data/command bus contention arbitration logic enabling only one of the one or more client controllers at a time access to the bus.

21. Apparatus for the transfer of data/command between a master controller and one or more client controllers, the apparatus comprising:

a bi-directional data bus for conveying plural bits of data or command between a master controller and one or more client controllers;

a direction signal controlling the direction in which data or command bits are conveyed on the data bus as between the master controller and one of the one or more client controllers;

a pair of ready signals including a transmit ready signal asserted by a source of data or command bits placed on the data bus and including a receive ready signal asserted by a destination for the data or command bits placed on the data bus;

a clock signal for indicating the presence of valid data or command bits on the data bus on a leading or trailing edge thereof;

data/command bus contention arbitration logic enabling only one of the one or more client controllers at a time access to the bus; and a pair of ready signals for each of the one or more client controllers, wherein each pair of ready signals includes a bi-directional transmit ready signal and a bi-directional receive ready signal, and wherein the functions of the transmit ready signals and the receive ready signals within the interface are modified by the state of the direction signal, whereby under a first state of the direction signal a transmit ready signal is asserted by the master controller to select one of the one or more client controllers as a destination for the data or command bits placed on the data bus and a corresponding receive ready signal is asserted by the one client controller to indicate that the one client controller is ready to receive the data or command bits placed on the data bus and whereby under a second state of the direction signal a transmit ready signal is asserted by the one or more client controllers to indicate the one or more client controllers is ready to transmit data or command bits placed on the data bus and a corresponding receive ready signal is asserted by the master controller to acknowledge receipt of data or command bits placed on the data bus by the one client controller.

22. The apparatus of claim 1, wherein the master controller and the one or more client controllers are connected to each other by means including any one of a flex circuit, a printed circuit board, a ribbon cable, a discrete wire cable and a wiring harness.

* * * * *